United States Patent [19]

Meunier et al.

[11] Patent Number: 4,834,451
[45] Date of Patent: May 30, 1989

[54] SEAT ELEMENT, IN PARTICULAR FOR AN AUTOMOBILE VEHICLE

[75] Inventors: Claude Meunier, Roches les Blamont; J-Marc Coussemacq, Valentigney; François Fourrey, Montbeliard, all of France

[73] Assignee: ECIA - Equipements et Composants Pour l'Industrie Automobile, Audincourt, France

[21] Appl. No.: 228,096

[22] Filed: Aug. 4, 1988

[30] Foreign Application Priority Data

Aug. 5, 1987 [FR] France ................................. 87 11150

[51] Int. Cl.⁴ .......................... A47C 7/02; A47C 31/00
[52] U.S. Cl. ..................................... 297/218; 297/452; 297/DIG. 1
[58] Field of Search .......... 297/452, DIG. 1, DIG. 2, 297/218, 219

[56] References Cited

U.S. PATENT DOCUMENTS

| 3,958,285 | 5/1976 | Gorman | 297/218 |
| 4,275,925 | 6/1981 | Harder | 297/452 |
| 4,408,797 | 10/1983 | Franck et al. | 297/452 |
| 4,699,427 | 10/1987 | Kobayashi | 297/DIG. 1 |

Primary Examiner—Francis K. Zugel
Attorney, Agent, or Firm—Sughrue, Mion, Zinn, Macpeak, and Seas

[57] ABSTRACT

Seat element for an automobile vehicle affording a particularly easy mounting and fixing of the covering. It comprises a tubular reinforcement (3) forming a closed frame supporting hooking rods (5, 7) and upholstery (9) covered with a covering (11) fixed to the hooking rods. A detachable element (22) for putting the covering under tension and maintaining this tension, is fittable on the reinforcement frame and constitutes the back or bottom of the seat element.

10 Claims, 2 Drawing Sheets

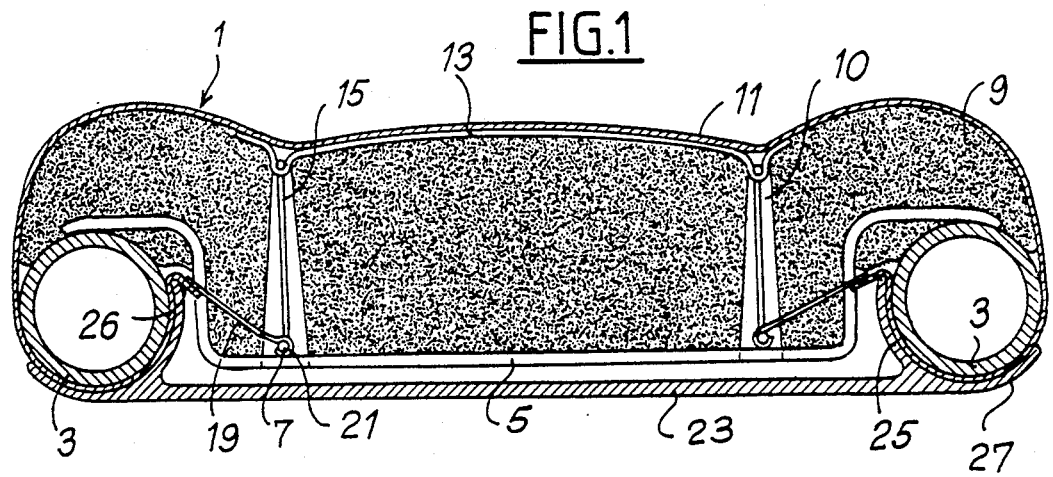
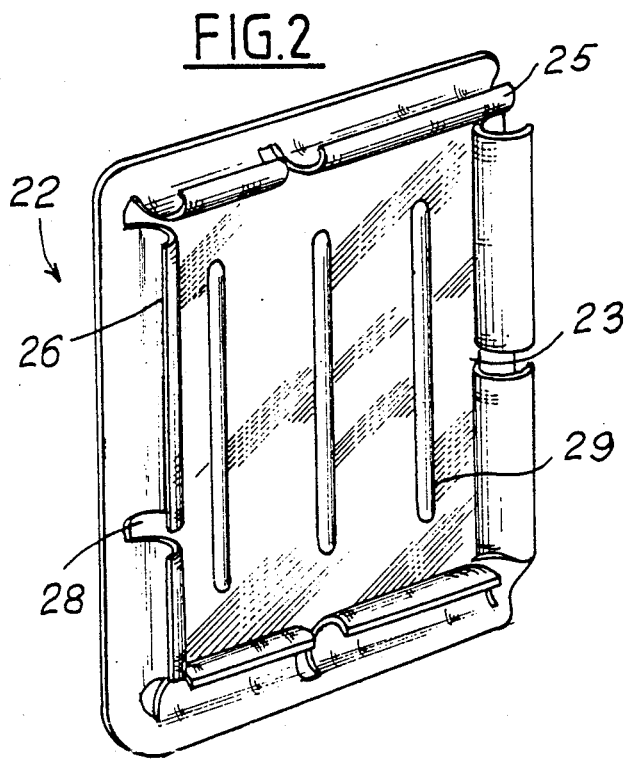

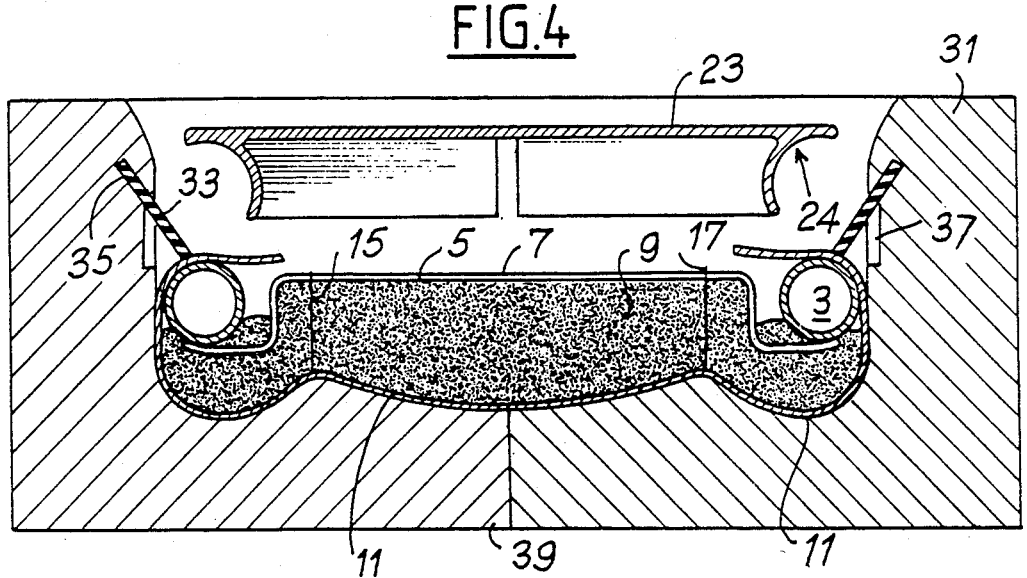
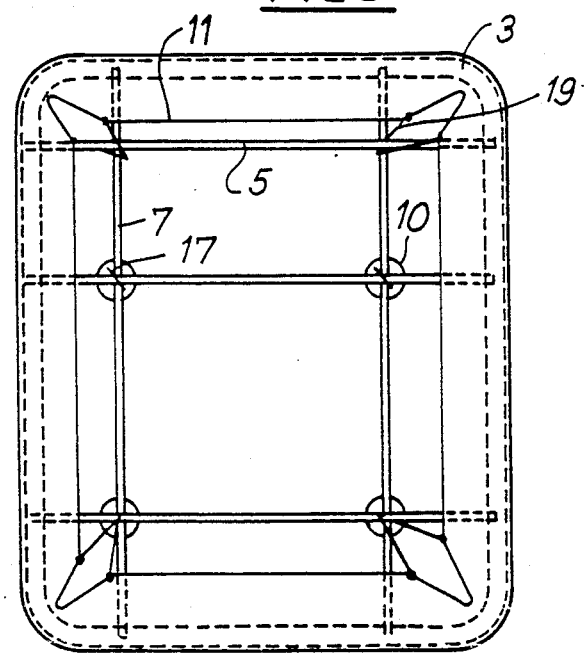

SEAT ELEMENT, IN PARTICULAR FOR AN AUTOMOBILE VEHICLE

The invention relates to a seat element, seat base or backrest, in particular for an automobile vehicle of simple and cheap manufacture the covering of which can be easily modified.

The manufacture of seat upholstery and the positioning of the latter on the corresponding reinforcements pose many problems, such as the multiplicity of the stitchings required for imparting the desired shape to the upholstery, the difficulty of access for hooking the upholstery at different points of the reinforcement, the necessity to permit the changing of any part of the upholstery, and in particular the covering, in the event of deterioration or accidental soiling.

An object of the present invention is to overcome these problems by providing a cheap seat element which is easy to assemble and has a covering which is easily modified as desired.

The invention provides a seat element, in particular for an automobile vehicle, comprising a reinforcement forming a closed frame and supporting hooking rods and upholstery covered by a covering provided with means for fixing to the hooking rods, said element further comprising a detachable element for maintaining and putting under tension the covering, fittable on the frame of the reinforcement and constituting the back or the bottom of the seat element.

According to other features of the invention:

the detachable maintaining element is formed by a plate having on substantially the whole of its periphery projecting lateral portions which fit on the reinforcement frame;

the lateral portions include a first portion in the shape of a portion of a cylinder open toward the exterior which puts the covering under tension, and a second portion extending the first portion beyond the plate for maintaining the covering;

the lateral portions have elastic deformation notches;

the fixing means are formed by shaping wires or threads fixed to the covering and hooking onto the hooking rods, and elastic tensioning connecting means located at the ends of the covering and connected to the latter.

The invention also provides a device for mounting a seat element comprising a hollow jig for receiving a previously-upholstered seat element, said jig having a bottom whose shape is complementary to that of the seat element and being provided throughout its inner periphery with retractable tension maintaining strips composed of an elastic material and inserted in inclined grooves.

The invention will be described in more detail hereinafter with reference to the accompanying drawings given solely by way of example and in which:

FIG. 1 is a sectional view of an upholstered seat element;

FIG. 2 is a perspective view of the detachable maintaining element;

FIG. 3 is a top view of the seat element shown in FIG. 1 before it is mounted on the maintaining element, and FIG. 4 is a sectional view of the mounting device according to the invention.

FIGS. 1 and 3 show a seat element, seat base or backrest for an automobile vehicle. The seat element, having the general reference numeral 1, comprises a tubular reinforcement 3 forming a closed frame on which are spotwelded hooking rods and reinforcing rods 5, 7. In the illustrated embodiment, the reinforcement has a circular cross-sectional shape but it will be understood that the invention is applicable to reinforcements which have a different cross-sectional shape and may be solid or hollow.

The rods 5, 7 are arranged perpendicular to one another so as to form a lattice structure. Pading upholstery 9 having the desired shape is placed on the unit formed by the rods and the reinforcement. The upholstery may be composed of any flexible material, preferably elastically yieldable foam material. It has a series of cavities 10 disposed in such manner as to correspond to the crossing points of the rods 5 and 7.

A covering 11, which may be of cloth or any other decorative material and is cut out in a suitable shape, covers the upholstery 9 and the reinforcement 3. A series of cloth bands 13 are fixed to the covering 11 by any suitable means, for example an adhesive or stitching, and are evenly spaced apart. These cloth bands are provided with tensioning and shaping threads 15 one end of which is fixed to the cloth bands whereas the other terminates in small hooks 17 adapted to hook onto the hooking rods 5 and 7.

The threads 15 are distributed among the various bands to correspond to the regions where the cavities 10 of the upholstery are provided and are put under tension so as to give the desired shape to the finished seat. Furthermore, the formed-over edge portions of the covering 11 extend beyond the reinforcement 3 and are provided with elastic connecting elements 19 for a prior tensioning comprising, at the ends remote from the ends by which they are fixed to the covering, hooks 21 fixed to the hooking rods 5 and 7.

A detachable element or back 22 ensures the complete maintenance and tensioning of the covering.

The back 22 (FIG. 2) is formed by a central plate 23 having lateral portions 24 or flanges which extend substantially throughout the periphery of the plate and project from one of the sides of the latter. The flanges 24 have a cross-sectional shape which is complementary to that of the frame. In the illustrated embodiment, they have substantially the shape of a portion of a cylinder which is open toward the exterior, or a trough shape, and fit onto the tubular frame 3. A first portion 25 of the flanges 24 is fitted onto the reinforcement in such manner that its end 26 urges the covering 11 toward the interior of the upholstery 9 and is located beyond a horizontal diameter of the reinforcement tube, this end 26 ensuring the tensioning of the elastic connecting elements 19. A second curved portion 27 extends the portion 25 beyond the plate 23 so as to complete the trough.

The flanges 24 include notches 28 permitting the necessary elastic deformation when the back 22 is fitted onto the reinforcement. If required, the plate 23 may have stiffening ribs 29.

The seat is upholstered in the following manner. First, the foam material 9 is placed on the reinforcement 3. It is covered with the covering 11 by taking care to introduce the threads 15 and the hooks 17 in the cavities 10. The assembly is then turned over and the threads 15 and the connecting elements 19 are fixed in position by placing the hooks 17 and 21 on the hooking rods 5 and 7, preferably in the region where the rods cross (FIG. 3). The upholstery then assumes the desired shape under the action of the threads 15 and the covering 11 is previously positioned under the action of the elastic connecting elements 19. The upholstery is terminated by fitting the back 22 against the reinforcement, the flanges 24 putting the covering 11 under tension and trapping it against the reinforcement 3. The fitting of the back thus achieves the final correct shaping and the suitable tensioning of the covering 11 by bearing against and rendering this covering taut on the reinforcement 3 by means of the flanges 24.

The seat element constructed in this way has many advantages. Owing to its suitable cut-out shape, the covering 11 requires only a small amount of prior shape-producing stitching. It is possible to modify, independently of one another, the colours and the respective materials of the covering and back. It is also very easy for the user to change the covering of his seat element when the latter has been accidentally damaged or soiled without requiring special tools and without an even partial deterioration of the other elements of the seat. It is of course also very easy to change the back 22 when the latter has been damaged. This feature is of particular interest in the case of a rear seat of an automobile vehicle whose seat base is tiltable forwardly and whose bracket is tiltable for the purpose of significantly increasing the available volume of the luggage compartment.

FIG. 4 shows another embodiment of the seat element 1 and its method of assembly.

The seat element 1 is previously upholstered and covered, but the covering 11 is only connected to the reinforcement by the threads 15 and the hooks 17 fixed to the hooking rods 5 and 7, its edge portions having no elastic connecting elements 19 or hooks 21. This seat element is placed, with its rear side facing upwardly, inside a hollow jig 31 whose bottom exactly reproduces the final shape of the seat element 1. The jig has throughout its inner periphery retractable strips 33 of rubber inserted in inclined recesses 35 from which they project toward the interior of the jig and define a progressively narrowing entrance. The upper portions of the jig 31 are rounded so as to facilitate the introduction of the seat element into the jig.

When the seat element is placed in position in the jig 31, the rubber strips 33 are partly urged back and place themselves in the axial receiving recesses 37 and contribute, by the effect of friction, to create and distribute the tensioning of the covering 11 all around the reinforcement 3.

As soon as the reinforcement 3 reaches the level of the recesses 37, the strips 33 progressively issue from these recesses owing to their elasticity and constrain the edge portion of the covering 11 to be formed over onto the back of th reinforcement 3 while maintaining the correct tension of this covering.

The back 22 can then be fitted in the manner described hereinbefore. The finished seat element is withdrawn by opening the jig 31 along at least one median plane of separation 39, which facilitates the withdrawal.

This second embodiment of the seat element of the invention enables the elastic tensioning elements 19 and the hooks 21 of the covering 11 to be eliminated, which renders the construction even cheaper.

We claim:

1. A seat element in particular for an automobile vehicle, comprising a reinforcement constituting a closed frame, hooking rods carried by said frame, upholstery, a covering covering the upholstery, means for fixing the covering to the hooking rods, and a detachable element for maintaining the covering and putting the covering under tension, fittable on said frame and constituting the back or the bottom of the seat element depending on the orientation of the seat element.

2. A seat element acording to claim 1, wherein said detachable element is constituted by a plate having on substantially the whole of its periphery lateral portions which project from one of the sides of the plate and fit on said frame.

3. A seat element according to claim 2, wherein said lateral portions have a first portion in the shape of a portion of a cylinder which is open toward the exterior of the plate and puts the covering under tension, and a second portion extending said first portion beyond the plate for maintaining the covering.

4. A seat element according to claim 2, wherein the lateral portions include notches for facilitating an elastic deformation of the lateral portions.

5. A seat element according to claim 2, wherein said detachable element comprises stiffening ribs in a central part thereof.

6. A seat element according to claim 1, wherein said fixing means comprise shape-producing thread-like members fixed to the covering and having hooks for engagement on the hooking rods.

7. A seat element according to claim 6, wherein said fixing means further comprise elastic tensioning elements having hooks located at ends of the covering and connected to the covering.

8. A device for assembling a seat element comprising a reinforcement constituting a closed frame, hooking rods carried by said frame, upholstery, a covering covering the upholstery, means for fixing the covering to the hooking rods, and a detachable element for maintaining the covering and putting the covering under tension, fittable on said frame and constituting the back or the bottom of the seat element depending on the orientation of the seat element, said device comprising a hollow jig for receiving a previously-upholstered seat element, said jig having a bottom whose shape is complementary to the shape of the upholstered seat element and defining grooves substantially throughout an inner periphery of the jig, and inwardly projecting strips which extend in said grooves substantially throughout the inner periphery of the jig, are capable of being urged back for putting under tension and maintaining the tension of the covering and are composed of an elastic material.

9. A device according to claim 8, wherein the jig comprises peripheral recesses for receiving the strips which are urged back by the seat element when the seat element enters the jig, the strips tending elastically to resume their normal projecting position as soon as the reinforcement reaches the level of said recesses so as to maintain the tension of the covering.

10. A device according to claim 7, wherein the jig is in at least two separable parts located on each side of at least one median plane of separation for facilitating the withdrawal of the seat element from the jig.

* * * * *